(12) United States Patent
Zeng et al.

(10) Patent No.: US 11,751,292 B2
(45) Date of Patent: Sep. 5, 2023

(54) ELECTROMAGNETICALLY HEATED COOKING UTENSIL, AND HEATING CONTROL CIRCUIT AND METHOD THEREFOR

(71) Applicant: FOSHAN SHUNDE MIDEA ELECTRICAL HEATING APPLIANCES MANUFACTURING CO., LTD., Foshan (CN)

(72) Inventors: Lutian Zeng, Foshan (CN); Jun Lei, Foshan (CN); Wei Zou, Foshan (CN); Yunfeng Wang, Foshan (CN); Fenglei Xing, Foshan (CN)

(*) Notice: Subject to any disclaimer, the term of this patent is extended or adjusted under 35 U.S.C. 154(b) by 436 days.

(21) Appl. No.: 16/977,819

(22) PCT Filed: Oct. 16, 2018

(86) PCT No.: PCT/CN2018/110440
§ 371 (c)(1),
(2) Date: Sep. 3, 2020

(87) PCT Pub. No.: WO2019/192157
PCT Pub. Date: Oct. 10, 2019

(65) Prior Publication Data
US 2021/0076460 A1 Mar. 11, 2021

(30) Foreign Application Priority Data

Apr. 3, 2018 (CN) .......................... 201810290875.8
Apr. 3, 2018 (CN) .......................... 201820470751.3

(51) Int. Cl.
*H05B 6/12* (2006.01)
*H05B 6/06* (2006.01)
*H05B 1/02* (2006.01)

(52) U.S. Cl.
CPC ............. *H05B 6/12* (2013.01); *H05B 1/0261* (2013.01); *H05B 6/06* (2013.01)

(58) Field of Classification Search
CPC ........ H05B 1/0261; H05B 6/06; H05B 6/065; H05B 6/12; H05B 6/1272; H05B 6/062;
(Continued)

(56) References Cited

FOREIGN PATENT DOCUMENTS

| CN | 2857721 Y | 1/2007 |
|---|---|---|
| CN | 201775462 U | 3/2011 |

(Continued)

OTHER PUBLICATIONS

Translation of CN203407030, "Double-ring fire electromagnetic heating apparatus and circuit thereof", Jan. 22, 2014, by proQuest (Year: 2014).*

(Continued)

*Primary Examiner* — Quang T Van
(74) *Attorney, Agent, or Firm* — KILPATRICK TOWNSEND & STOCKTON, LLP

(57) ABSTRACT

An electromagnetically heated cooking utensil, and a heating control circuit and method therefor. The heating control circuit includes a first resonance device; a second resonance device; a first power switch; a second power switch; a first synchronization device that detects voltages of both ends of the first resonance device to output a first synchronization signal; a second synchronization device that detects voltages of both ends of the second resonance device to output a second synchronization signal; and a control device that selects, according to the heating mode of the electromagnetically heated cooking utensil, the first synchronization signal to generate a driving signal for driving the first power switch, a second synchronization signal to generate a driving signal for driving the second power switch.

9 Claims, 2 Drawing Sheets

(58) Field of Classification Search
CPC ........ H05B 6/1209; Y02B 40/00; A47J 27/00; A47J 27/08; A47J 36/2483
USPC ....... 219/620, 621, 624, 635, 650, 660, 661, 219/667, 668, 672
See application file for complete search history.

(56) References Cited

FOREIGN PATENT DOCUMENTS

| | | | |
|---|---|---|---|
| CN | 102291864 A | | 12/2011 |
| CN | 203407030 U | | 1/2014 |
| CN | 103596307 A | | 2/2014 |
| CN | 104244483 A | | 12/2014 |
| CN | 204438245 U | | 7/2015 |
| CN | 105246182 A | | 1/2016 |
| CN | 105698230 A | | 6/2016 |
| CN | 105764175 A | | 7/2016 |
| CN | 105792399 A | | 7/2016 |
| CN | 106162973 A | | 11/2016 |
| CN | 205847645 U | * | 12/2016 |
| CN | 106535381 A | | 3/2017 |
| CN | 206506730 U | | 9/2017 |
| JP | 2001196156 A | | 7/2001 |
| JP | 2003153550 A | | 5/2003 |
| JP | 3567145 B2 | | 9/2004 |
| JP | 3631703 B2 | | 3/2005 |
| JP | 2011070873 A | | 4/2011 |
| JP | 2015013096 A | | 1/2015 |
| WO | 2013061595 A1 | | 5/2013 |

OTHER PUBLICATIONS

Translation of CN205847645U, "Novel detection and controlling of electromagnetic heating controller spare back pressure device", Dec. 28, 2016, by ProQuest. (Year: 2016).*
OA for JP application 2020-540796.
OA for EP application 18913373.9.
The Methods of Reliability Analysis and Enhance For IH Electromagnetic Heaters.
A Study on the Noise Suppression in High Frequency Acoustic Noise of IH Cooking Heater.
OA for CN application 201810290875.8.
ISR for PCT application PCT/CN2018/110440.

* cited by examiner

ELECTROMAGNETICALLY HEATED COOKING UTENSIL, AND HEATING CONTROL CIRCUIT AND METHOD THEREFOR

CROSS-REFERENCES TO RELATED APPLICATIONS

The present disclosure is a national phase application of International Application No. PCT/CN2018/110440, filed on Oct. 16, 2018, which claims priority to and benefits of Chinese Patent Application Serial Nos. 201810290875.8 and 201820470751.3, filed with the National Intellectual Property Office Administration of P. R. China on Apr. 3, 2018, the entire contents of which are incorporated herein by reference.

FILED

The present disclosure relates to a field of household appliances, and more particularly to a heating control circuit for an electromagnetically-heating cooking utensil, an electromagnetically-heating cooking utensil and a heating control method for an electromagnetically-heating cooking utensil.

BACKGROUND

For most of the electromagnetically-heating cooking utensils (such as an induction cooker, a rice cooker and an electric pressure cooker), only one heating coil is applied, and most power is concentrated at the center of the bottom of the utensils. Due to the concentrated power, the heating is uneven, which leads to complains from the customers about the poor cooking effect.

Currently, some cooking appliances adopt a heating scheme of double coil disks in a shape of inner and outer rings to form two independent resonance systems, resulting in better effect. However, in this scheme, the synchronization circuit applied in each of the two resonance systems is independent from each other and thus performs resonance operation freely, resulting in the following problem. Since the inner and outer ring coil disks are placed inside the same cooking utensil, the distance between the two disks is relatively close. When two coils work at the same time, the magnetic fields between them will cause coupling interference. Due to the independently resonance operations, the coils may work asynchronously. Sometimes the magnetic fields are superimposed in the same direction and sometimes counteracted in different directions, and thus the synthesized vector magnetic field is unstable. In this case, the synchronization circuit is unstable, the heating efficiency is low, and the switch may even be damaged, which affects the service life of the product.

SUMMARY

The present disclosure seeks to solve at least one of the problems that exist in the related art to at least some extent. Accordingly, a first object of the present disclosure is to provide a heating control circuit for an electromagnetically-heating cooking utensil. By adding a dual-channel resonance heating system which may select a synchronizing signal trigger source, the heating uniformity for the electromagnetically-heating cooking utensil may be improved, thus improving the heating efficiency of the cooking system and the service life of the switch.

A second object of the present disclosure is to provide an electromagnetically-heating cooking utensil.

A third object of the present disclosure is to provide a heating control method for an electromagnetically-heating cooking utensil.

Embodiments of the present disclosure provide a heating control circuit for an electromagnetically-heating cooking utensil, including: a first resonance device; a second resonance device, one end of the second resonance device being connected to one end of the first resonance device and further connected to a power supply device of the electromagnetically-heating cooking utensil, in which the first resonance device includes a first resonance capacitor and a first coil disk connected in parallel, the second resonance device includes a second resonance capacitor and a second coil disk connected in parallel, and the first coil disk and the second coil disk are arranged in a form of an inner ring and an outer ring; a first power switch configured to control whether the first resonance device performs a resonance operation, a first end of the first power switch being connected to the other end of the first resonance device; a second power switch configured to control whether the second resonance device performs a resonance operation, a first end of the second power switch being connected to the other end of the second resonance device, and a second end of the second power switch being connected to a second end of the first power switch and further grounded; a first synchronization device connected to two ends of the first resonance device and configured to detect a voltage of the two ends of the first resonance device to output a first synchronization signal; a second synchronization device connected to two ends of the second resonance device and configured to detect a voltage of the two ends of the second resonance device to output a second synchronization signal; a control device including a first synchronization signal detecting terminal, a second synchronization signal detecting terminal, a first driving output terminal and a second driving output terminal. The first synchronization signal detecting terminal is connected to an output terminal of the first synchronization device, the second synchronization signal detecting terminal is connected to an output terminal of the second synchronization device, the first driving output terminal is connected to a control terminal of the first power switch and the second driving output terminal is connected to a control terminal of the second power switch. The control device is configured to select the first synchronization signal to generate a driving signal for driving the first power switch, select the second synchronization signal to generate a driving signal for driving the second power switch, and select one of the first synchronization signal and the second synchronization signal to generate a driving signal for driving the first power switch and the second power switch, according to a heating mode of the electromagnetically-heating cooking utensil.

With such a heating control circuit for an electromagnetically-heating cooking utensil of the present disclosure, the control device selects the first synchronization signal to generate the driving signal for driving the first power switch, selects the second synchronization signal to generate the driving signal for driving the second power switch, and selects one of the first synchronization signal and the second synchronization signal to generate the driving signal for driving the first power switch and the second power switch, according to the heating mode of the electromagnetically-heating cooking utensil. Therefore, by adding the dual-channel resonance heating system which may select the synchronizing signal trigger source, the heating efficiency of the cooking system is improved and the service life of the switch is increased.

In addition, the heating control circuit for an electromagnetically-heating cooking utensil provided in the above embodiments may further include following additional embodiments.

In an embodiment of the present disclosure, the first coil disk and the second coil disk have the same inductance and the same winding direction, and the first resonance capacitor and the second resonance capacitor have the same capacitance.

In an embodiment of the present disclosure, the control device includes: a first driving circuit, an output terminal of the first driving circuit being connected to the control terminal of the first power switch, and the first driving circuit being configured to drive the first power switch to be on or off; a second driving circuit, an output terminal of the second driving circuit being connected to the control terminal of the second power switch, and the second driving circuit being configured to drive the second power switch to be on or off; a controller configured to generate a first control signal according to the first synchronization signal to output a driving signal through the first driving circuit, generate a second control signal according to the second synchronization signal to output a driving signal through the second driving circuit, and generate a third control signal according to one of the first synchronization signal and the second synchronization signal to output a driving signal through the first driving circuit and the second driving circuit, respectively.

In an embodiment of the present disclosure, the controller includes: a first pulse generator and a second pulse generator; a first selection switch, a first end of the first selection switch being connected to the output terminal of the first synchronization device and a second end of the first selection switch being connected to the first pulse generator; a second selection switch, a first end of the second selection switch being connected to the output terminal of the second synchronization device, a second end of the second selection switch being connected to the second pulse generator, and a third end of the second selection switch being connected to a third end of the first selection switch; a third selection switch, a first end of the third selection switch being connected to the output terminal of the first synchronization device, a second end of the third selection switch being connected to the third end of the first selection switch and the third end of the second selection switch, respectively, and a third end of the third selection switch being connected to the first end of the second selection switch; where the controller is configured to control the first selection switch, the second selection switch and the third selection switch to select the first synchronization signal, the second synchronization signal, or one of the first synchronization signal and the second synchronization signal.

In an embodiment of the present disclosure, when the first end of the first selection switch is connected to the second end of the first selection switch, the controller outputs the first control signal through the first pulse generator according to the first synchronization signal, and the first resonance device performs the resonance operation; when the first end of the second selection switch is connected to the second end of the second selection switch, the controller outputs the second control signal through the second pulse generator according to the second synchronization signal, and the second resonance device performs the resonance operation; when the second end of the first selection switch is connected to the third end of the first selection switch, the second end of the second selection switch is connected to the third end of the second selection switch and the first end of the third selection switch is connected to the second end of the third selection switch, the controller outputs a control signal through the first pulse generator and the second pulse generator, respectively, according to the first synchronization signal, and the first resonance device and the second resonance device perform the resonance operations simultaneously; when the second end of the first selection switch is connected to the third end of the first selection switch, the second end of the second selection switch is connected to the third end of the second selection switch and the second end of the third selection switch is connected to the third end of the third selection switch, the controller outputs a control signal through the first pulse generator and the second pulse generator, respectively, according to the second synchronization signal, and the first resonance device and the second resonance device perform the resonance operations simultaneously.

In an embodiment of the present disclosure, the first synchronization device and the second synchronization device both include a comparator and share a detection branch.

Embodiments of the present disclosure provide an electromagnetically-heating cooking utensil, including a heating control circuit for an electromagnetically-heating cooking utensil as described above.

With such an electromagnetically-heating cooking utensil of the present disclosure, by applying the heating control circuit for the electromagnetically-heating cooking utensil as described above, the heating efficiency of the cooking system is improved and the service life of the switch is increased.

Embodiments of the present disclosure provide a heating control method for an electromagnetically-heating cooking utensil, including: receiving a heating power instruction, and acquiring the heating mode of the electromagnetically-heating cooking utensil according to the heating power instruction; according to the heating mode of the electromagnetically-heating cooking utensil, selecting the first synchronization signal to generate the driving signal for driving the first power switch, or selecting the second synchronization signal to generate the driving signal for driving the second power switch, or selecting one of the first synchronization signal and the second synchronization signal to generate the driving signal for driving the first power switch and the second power switch.

With such a heating control method for an electromagnetically-heating cooking utensil of the present disclosure, by receiving the heating power instruction, acquiring the heating mode of the electromagnetically-heating cooking utensil according to the heating power instruction, and selecting the first synchronization signal to generate the driving signal for driving the first power switch, or selecting the second synchronization signal to generate the driving signal for driving the second power switch, or selecting one of the first synchronization signal and the second synchronization signal to generate the driving signal for driving the first power switch and the second power switch, according to the heating mode of the electromagnetically-heating cooking utensil, the method may improve the heating efficiency of the cooking system and increase the service life of the switch.

Additional embodiments of present disclosure will be given in part in the following descriptions, become apparent in part from the following descriptions, or be learned from the practice of the embodiments of the present disclosure.

DETAILED DESCRIPTION OF THE DISCLOSURE

Figure 1:
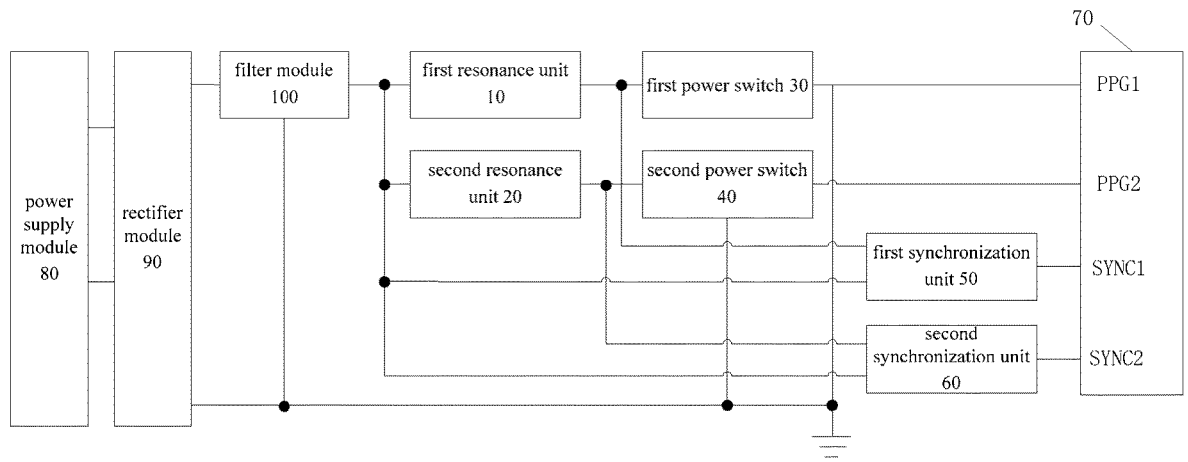
FIG. 1 is a block diagram of a heating control circuit for an electromagnetically-heating cooking utensil according to an embodiment of the present disclosure.

Embodiments of the present disclosure are described in detail below, examples of which are illustrated in the drawings. The same or similar elements are denoted by same reference numerals in different drawings unless indicated otherwise. The embodiments described herein with reference to drawings are explanatory, and used to generally understand the present disclosure. The embodiments shall not be construed to limit the present disclosure.

A heating control circuit for an electromagnetically-heating cooking utensil, an electromagnetically-heating cooking utensil and a heating control method for an electromagnetically-heating cooking utensil provided in the present disclosure are described below with reference to the drawings.

Figure 2:
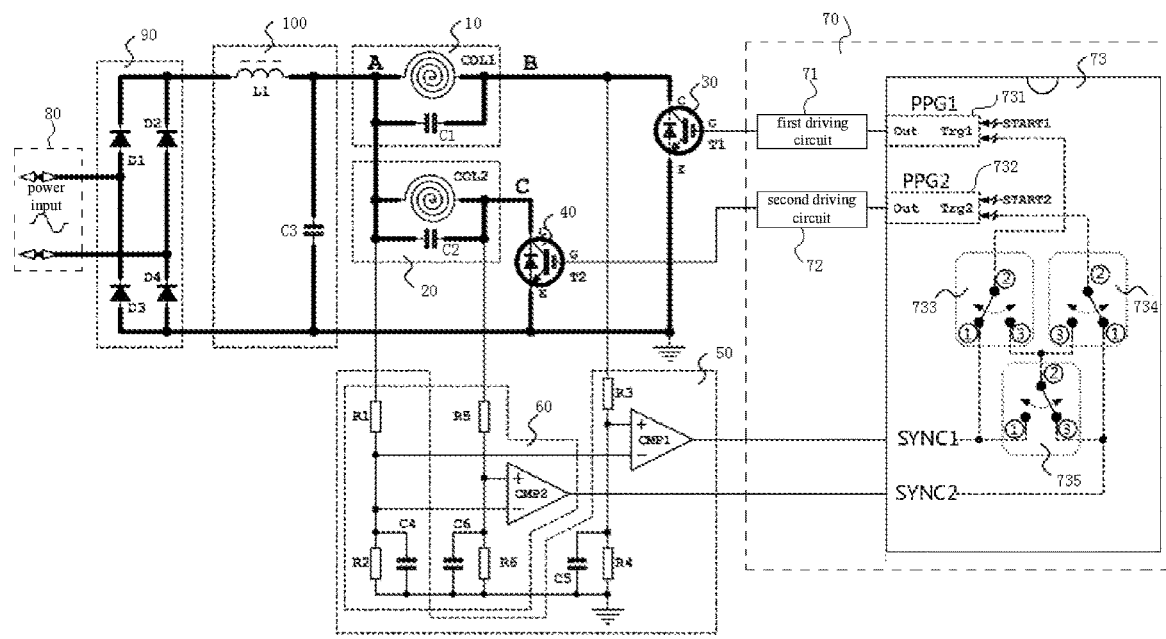
FIG. 2 is a schematic diagram of a heating control circuit for an electromagnetically-heating cooking utensil according to an embodiment of the present disclosure.

FIG. 1 is a block diagram of a heating control circuit for an electromagnetically-heating cooking utensil according to an embodiment of the present disclosure. FIG. 2 is a schematic diagram of a heating control circuit for an electromagnetically-heating cooking utensil according to an embodiment of the present disclosure.

As shown in FIGS. 1 and 2, the a heating control circuit for an electromagnetically-heating cooking utensil according to an embodiment of the present disclosure includes a first resonance device 10, a second resonance device 20, a first power switch 30, a second power switch 40, a first synchronization device 50, a second synchronization device 60 and a control device 70.

In one embodiment, one end of the second resonance device 20 is connected to one end of the first resonance device 10 and further connected to a power supply device 80 of the electromagnetically-heating cooking utensil. The first resonance device 10 includes a first resonance capacitor C1 and a first coil disk COL1 connected in parallel, the second resonance device 20 includes a second resonance capacitor C2 and a second coil disk COL2 connected in parallel, and the first coil disk COL1 and the second coil disk COL2 are arranged in a form of an inner ring and an outer ring. A first end of the first power switch 30 is connected to the other end of the first resonance device 10. The first power switch 30 configured to control whether the first resonance device 10 performs a resonance operation. A first end of the second power switch 40 is connected to the other end of the second resonance device 20, and a second end of the second power switch 40 is connected to a second end of the first power switch 30 and further grounded. The second power switch 40 is configured to control whether the second resonance device 20 performs a resonance operation. The first synchronization device 50 is connected to two ends of the first resonance device 10 and configured to detect a voltage of the two ends of the first resonance device 10 to output a first synchronization signal. The second synchronization device 60 is connected to two ends of the second resonance device 20 and configured to detect a voltage of the two ends of the second resonance device 20 to output a second synchronization signal.

The control device 70 may include a first synchronization signal detecting terminal SYNC1, a second synchronization signal detecting terminal SYNC2, a first driving output terminal PPG1 and a second driving output terminal PPG2. The first synchronization signal detecting terminal SYNC1 is connected to an output terminal of the first synchronization device 50, the second synchronization signal detecting terminal SYNC2 is connected to an output terminal of the second synchronization device 60, the first driving output terminal PPG1 is connected to a control terminal of the first power switch 30 and the second driving output terminal PPG2 is connected to a control terminal of the second power switch 40. The control device 70 is configured to select the first synchronization signal to generate a driving signal for driving the first power switch 30, select the second synchronization signal to generate a driving signal for driving the second power switch 40, and select one of the first synchronization signal and the second synchronization signal to generate a driving signal for driving the first power switch 30 and the second power switch 40, according to a heating mode of the electromagnetically-heating cooking utensil.

In addition, as shown in FIGS. 1 and 2, the heating control circuit for the electromagnetically-heating cooking utensil may further include a rectifier device 90 and a filter device 100. The rectifier device 90 includes diodes D1 to D4 and is configured to convert an alternating current input by the power supply device 80 into a direct current. The filter device 100 includes an inductor L1 and a capacitor C3, and is configured to convert a pulsating voltage into a smooth voltage.

In an embodiment of the present disclosure, the first coil disk COL1 and the second coil disk COL2 have the same inductance and the same winding direction, and the first resonance capacitor C1 and the second resonance capacitor C2 have the same capacitance. In this way, the resonance frequencies of the first resonance device 10 and the second resonance device 20 during the resonance operation are the same. A phase difference between magnetic field phases generated by the first coil disk COL1 and the second coil disk COL2 maintains at zero at any time, and the resultant magnetic field is maximum, the heating efficiency is maximum, and, at the same time, the first synchronization device 50 and the second synchronization device 60 are more stable, the first power switch and the second power switch may be operated more safely and the service life of the power switch is effectively improved.

In an embodiment of the present disclosure, as shown in FIG. 2, the first synchronization device 50 and the second synchronization device 60 both include a comparator and share a detection branch. In other words, the first synchronization device 50 may include resistors R1, R2, R3 and R4, capacitors C4 and C5, and a comparator CMP1. The second synchronization device 60 may include resistors R1, R2, R5 and R6, capacitors C4 and C6, and a comparator CMP2. The synchronization device includes a voltage-dividing sampling circuit and a comparator. The resistors R1, R2 and capacitor C4 form a voltage-dividing sampling circuit for collecting a voltage at point A of the resonance device. The first synchronization device 50 and the second synchronization device 60 share the voltage-dividing sampling circuit, and are configured to collect a voltage at point A of the first resonance device 10 and the second resonance device 20, respectively. Resistors R3, R4 and capacitor C5 form a voltage-dividing sampling circuit for collecting a voltage at point B of the first resonance device 10. Resistors R5, R6 and capacitor C6 form a voltage-dividing sampling circuit for collecting a voltage at point C of the second resonance device 20. The comparator CMP1 is configured to compare the voltage at point A and the voltage at point B of the first resonance device 10 to output a synchronization signal, and the comparator CMP2 is configured to compare the voltage at point A and the voltage at point C of the second resonance device 20 to output a synchronization signal. In one embodiment, when the voltage at point A is greater than the voltage at point B, a voltage at a non-inverting input terminal of the comparator CMP1 is less than a voltage at an inverting input terminal of the comparator CMP1, and the comparator CMP1 outputs a low level signal. When the voltage at point A is less than the voltage at point B, the voltage at the non-inverting input terminal of the comparator CMP1 is greater than the voltage at the inverting input terminal of the comparator CMP1, and the comparator CMP1 outputs a high level signal.

In one embodiment, after the electromagnetically-heating cooking utensil is powered on, it receives a heating power instruction from a user, and acquires the heating mode of the electromagnetically-heating cooking utensil according to the heating power instruction. In one embodiment, when the heating power is small, a heating system corresponding to the first resonance device 10 may be controlled to work, or a heating system corresponding to the second resonance device 20 may be controlled to work. When the heating power is large, the heating systems corresponding to the first resonance device 10 and the second resonance device 20 may be controlled to work simultaneously. The control device 70 may switch a trigger source according to the heating mode. In one embodiment, when the heating system corresponding to the first resonance device 10 is selected to work (the inner coil disk works), the first synchronization device 50 collects a resonance voltage at the two ends of the first coil disk COL1 (i.e., a voltage across the first capacitor C1) through the sampling circuit, to output the first synchronization signal (such as a falling edge signal) to the control device 70. The control device 70 outputs a valid pulse signal through the first driving output terminal PPG1 to control the first power switch 30 to be on and off, and the first power switch 30 controls connection and disconnection between the power supply device 80 and the first resonance device 10 according to the driving signal. When the first driving output terminal outputs a high level signal, the first power switch 30 is turned on, the first resonance device 10 is connected to the power supply device 80 and stores energy for the first coil disk COL1, and the first resonance device 10 converts the electric field energy into the electromagnetic energy to realize heating the electromagnetically-heating cooking utensil. When the first driving output terminal outputs a low level signal, the first power switch 30 is turned off, and the first resonance device 10 is disconnected from the power supply device 80.

Similarly, when the heating system corresponding to the second resonance device 20 is selected to work, a control method in this case is the same as that for the first resonance device 10. When the two heating systems work simultaneously, the control device 70 may control the first resonance device and the second resonance device to work simultaneously according to each of the first synchronization signal and the second synchronization signal. A control method in this case may combine with the processes when the first resonance device 10 and the second resonance device 20 work, and specific steps will be described in detail in the following embodiments.

Further, in an embodiment of the present disclosure, as shown in FIG. 2, the control device 70 may include: a first driving circuit 71, a second driving circuit 72 and a controller 73. An output terminal of the first driving circuit 71 is connected to the control terminal of the first power switch 30, and the first driving circuit 71 is configured to drive the first power switch 30 to be on or off. An output terminal of the second driving circuit 72 is connected to the control terminal of the second power switch 40, and the second driving circuit 72 is configured to drive the second power switch 40 to be on or off. The controller 73 is configured to generate a first control signal according to the first synchronization signal to output a driving signal through the first driving circuit 71, generate a second control signal according to the second synchronization signal to output a driving signal through the second driving circuit 72, and generate a third control signal according to one of the first synchronization signal and the second synchronization signal to output a driving signal through the first driving circuit 71 and the second driving circuit 72, respectively.

In other words, the driving circuit is configured to convert the signal level in a range output by the controller 73 into a level signal in a range that can be received by the power switch. In one embodiment, the controller 73 may output a low level of 0V and a high level of 5V, and the power switch may receive a low level of 0V and a high level of 18V, in this case the first driving circuit 71 is configured to convert the high level of 5V output by the controller 73 through the first driving output terminal PPG1 into the high level of 18V that can be received by the first power switch 30, to drive the first power switch 30 to work.

In an embodiment of the present disclosure, as shown in FIG. 2, the controller 73 may include: a first pulse generator 731, a second pulse generator 732, a first selection switch 733, a second selection switch 734 and a third selection switch 735. A first end of the first selection switch 733 is connected to the output terminal of the first synchronization device 50 and a second end of the first selection switch 733 is connected to the first pulse generator 731. A first end of the second selection switch 734 is connected to the output terminal of the second synchronization device 60, a second end of the second selection switch 734 is connected to the second pulse generator 732, and a third end of the second selection switch 734 connected to a third end of the first selection switch 733. A first end of the third selection switch 735 is connected to the output terminal of the first synchronization device 50, a second end of the third selection switch 735 is connected to the third end of the first selection switch 733 and the third end of the second selection switch 734, respectively, and a third end of the third selection switch 735 is connected to the first end of the second selection switch 734. The controller 73 is configured to control the first selection switch 733, the second selection switch 734 and the third selection switch 735 to select the first synchronization signal, the second synchronization signal, or one of the first synchronization signal and the second synchronization signal.

Further, in an embodiment of the present disclosure, when the first end of the first selection switch 733 is connected to the second end of the first selection switch 733, the controller 73 outputs the first control signal through the first pulse generator 731 according to the first synchronization signal, and the first resonance device 10 performs the resonance operation. When the first end of the second selection switch 734 is connected to the second end of the second selection switch 734, the controller 73 outputs the second control signal through the second pulse generator 732 according to the second synchronization signal, and the second resonance device 20 performs the resonance operation. When the second end of the first selection switch 733 is connected to the third end of the first selection switch 733, the second end of the second selection switch 734 is connected to the third end of the second selection switch 734 and the first end of the third selection switch 735 is connected to the second end of the third selection switch 735, the controller 73 outputs a control signal through the first pulse generator 731 and the second pulse generator 732, respectively, according to the first synchronization signal, and the first resonance device 10 and the second resonance device 20 perform the resonance operations simultaneously. When the second end of the first selection switch 733 is connected to the third end of the first selection switch 733, the second end of the second selection switch 734 is connected to the third end of the second selection switch 734 and the second end of the third selection switch 734 is connected to the third end of the third selection switch 735, the controller 73 outputs a control signal through the first pulse generator 731 and the second pulse generator 732, respectively, according to the second synchronization signal, and the first resonance device 10 and the second resonance device 20 perform the resonance operations simultaneously.

Working processes of the first coil disk and the second coil disk will be described in detail below.

(1) Working Process of the First Coil Disk (Inner Coil Disk) Heating Mode

The first end ① and the second end ② of the first selection switch 733 are connected. The first synchronization signal from the first synchronization signal input terminal SYNC1 is sent to an input terminal Trg1 of the first pulse generator 731 through the first selection switch 733. The controller 73 sets a flag START1, inputs a trigger signal (the first synchronization signal) to the input terminal Trg1 of the first pulse generator 731, and starts a first pulse output.

In stage 1, the controller 73 controls the first pulse generator 731 to output the first control signal, i.e., a valid signal, according to the first synchronization signal. In this embodiment, the valid signal is a high level of 5V, and an invalid signal is a low level of 0V. The first driving circuit 71 outputs a high level signal (such as 18V), a C electrode (collector) and an E electrode (emitter) of the first power switch 30 are connected, the first coil disk COL1 of the first resonance device 10 is powered from the power supply device 80, and a current increases linearly from zero. After a period of time t1, the current reaches I1. At this time, the voltage at point A is greater than the voltage at point B. The voltage at the inverting terminal of the comparator CMP1 is greater than the voltage at the non-inverting terminal of the comparator CMP1. The output terminal of the comparator CMP1 outputs a low level signal.

In stage 2, the controller 73 controls the first pulse generator 731 to output an invalid signal (such as 0V), the first driving circuit 71 outputs a low level signal (such as 0V), and the C and E electrodes of the first power switch 30 are disconnected. Since the current of the first coil disk COL1 cannot be changed suddenly, the current of the first coil disk COL1 flows through the first resonance capacitor C1, and at the same time the first resonance capacitor C1 is discharged to the first coil disk COL1, and the voltage across the two ends, point A and point B, of the first resonance capacitor C1 gradually decreases. When the voltage across the two ends, point A and point B, of the first resonance capacitor C1 is 0V, the current of the first coil disk COL1 reaches a maximum value. At the next moment, due to the nature that the current of the first coil disk COL1 cannot be changed suddenly, the first resonance capacitor C1 is charged, and the voltage at point A of the first resonance capacitor C1 is lower than the voltage at point B of the first resonance capacitor C1. The voltage at the non-inverting terminal of the comparator CMP1 is greater than the voltage at the inverting terminal of the comparator CMP1, and the output terminal of the comparator CMP1 outputs a rising edge voltage inversion signal from low level to high level.

In stage 3, the first resonance capacitor C1 is charged from the first coil disk COL1, the current decreases to zero, the voltage across the first resonance capacitor C1 reaches a maximum value, and the voltage at the point A is lower than the voltage at the point B. After that, the first resonance capacitor C1 is discharged to the first coil disk COL1. When the voltage across the first resonance capacitor C1 is discharged to 0V, the current of the first coil disk COL1 reaches a maximum value. At the next moment, due to the nature that the current of the first coil disk COL1 cannot be changed suddenly, the first resonance capacitor C1 is charged, and the voltage at point A of the first resonance capacitor C1 is greater than the voltage at point B of the first resonance capacitor C1. The voltage at the inverting terminal of the comparator CMP1 is greater than the voltage at the non-inverting terminal of the comparator CMP1, and the output terminal of the comparator CMP1 outputs a falling edge voltage inversion signal from high level to low level.

After this falling edge voltage inversion signal is input to the first synchronization signal detecting terminal SYNC1 of the controller 73, it is sent to the input terminal Trg1 of the first pulse generator 731 through the first selection switch 733, to automatically trigger the first pulse generator 731 to output a valid signal for a next cycle. The process of stage 1 is performed again. In this way, the resonance heating of the inner coil disk is achieved.

(2) Working Process of the Second Coil Disk (Outer Coil Disk) Heating Mode

The first end ① and the second end ② of the second selection switch 734 are connected. The second synchronization signal from the second synchronization signal input terminal SYNC2 is sent to an input terminal Trg2 of the second pulse generator 732 through the second selection switch 734. The controller 73 sets a flag START2, inputs a trigger signal (the second synchronization signal) to the input terminal Trg2 of the second pulse generator 732, and starts a first pulse output.

In stage 1, the controller 73 controls the second pulse generator 732 to output the second control signal, i.e., a valid signal, according to the second synchronization signal. The second driving circuit 72 outputs a high level signal (such as 18V), a C electrode and an E electrode of the second power switch 40 are connected, the second coil disk COL2 of the second resonance device 20 is powered from the power supply device 80, and a current increases linearly from zero. After a period of time t1', the current reaches I1. At this time, the voltage at point A is greater than the voltage at point C. The voltage at the inverting terminal of the comparator CMP2 is greater than the voltage at the non-inverting terminal of the comparator CMP2. The output terminal of the comparator CMP2 outputs a low level signal.

In stage 2, the controller 73 controls the second pulse generator 732 to output an invalid signal (such as 0V), the second driving circuit 72 outputs a low level signal (such as 0V), and the C and E electrodes of the second power switch 40 are disconnected. Since the current of the second coil disk COL2 cannot be changed suddenly, the current of the second coil disk COL2 flows through the second resonance capacitor C2, and at the same time the second resonance capacitor C2 is discharged to the second coil disk COL2, and the voltage across the two ends, point A and point C, of the second resonance capacitor C2 gradually decreases. When the voltage across the two ends, point A and point B, of the second resonance capacitor C2 is 0V, the current of the second coil disk COL2 reaches a maximum value. At the next moment, due to the nature that the current of the second coil disk COL2 cannot be changed suddenly, the second resonance capacitor C2 is charged, and the voltage at point A of the second resonance capacitor C2 is lower than the voltage at point C of the second resonance capacitor C2. The voltage at the non-inverting terminal of the comparator CMP2 is greater than the voltage at the inverting terminal of the comparator CMP2, and the output terminal of the comparator CMP2 outputs a rising edge voltage inversion signal from low level to high level.

In stage 3, the second resonance capacitor C2 is charged from the second coil disk COL2, the current decreases to zero, the voltage across the second resonance capacitor C2 reaches a maximum value, and the voltage at the point A is lower than the voltage at the point C. After that, the second resonance capacitor C2 is discharged to the second coil disk COL2. When the voltage across the second resonance capacitor C2 is discharged to 0V, the current of the second coil disk COL2 reaches a maximum value. At the next moment, due to the nature that the current of the second coil disk COL2 cannot be changed suddenly, the second resonance capacitor C2 is charged, and the voltage at point A of the second resonance capacitor C2 is greater than the voltage at point C of the second resonance capacitor C2. The voltage at the inverting terminal of the comparator CMP2 is greater than the voltage at the non-inverting terminal of the comparator CMP2, and the output terminal of the comparator CMP2 outputs a falling edge voltage inversion signal from high level to low level.

After this falling edge voltage inversion signal is input to the second synchronization signal detecting terminal SYNC2 of the controller 73, it is sent to the input terminal Trg2 of the second pulse generator 732 through the second selection switch 734, to automatically trigger the second pulse generator 732 to output a valid signal for a next cycle. The process of stage 1 is performed again. In this way, the resonance heating of the outer coil disk is achieved.

(3) Working Process of a Heating Mode where the Inner and Outer Ring Coil Disks Work Simultaneously (the Controller Controls the First Resonance Device and the Second Resonance Device to Work Simultaneously According to the First Synchronization Signal)

The first end ① and the second end ② of the third selection switch 735 are connected, the second end ② and the third end ③ of the first selection switch 733 are connected, and the second end ② and the third end ③ of the second selection switch 734 are connected. The first synchronization signal is passed through the first selection switch 733, the second selection switch 734 and the third selection switch 735, and sent to the input terminal Trg1 of the first pulse generator 731 and the input terminal Trg2 of the second pulse generator 732, respectively. The controller 73 sets the flags START1 and START2, inputs a trigger signal (the first synchronization signal) to the input terminal Trg1 of the first pulse generator 731 and to the input terminal Trg2 of the second pulse generator 732, and starts a first pulse output.

In stage 1, the controller 73 controls, according to the first synchronization signal, the first pulse generator 731 and the second pulse generator 732 to output the valid signals simultaneously. The first driving circuit 71 and the second driving circuit 72 output a high level signal (such as 18V), respectively. The first power switch 30 and the second power switch 40 are turned on at the same time, and the subsequent working process is similar to that of the inner ring and the outer ring described above, except that the first synchronization signal is passed through the internal selection switches and sent to the input terminal Trg1 of the first pulse generator 731 and the input terminal Trg2 of the second pulse generator 732, respectively. The first synchronization signal is used to trigger the first pulse generator 731 and the second pulse generator 732 to output a valid signal for a next cycle, and then the process of the stage 1 is performed again. In this way, the inner and outer ring coil disks are controlled by the first synchronization signal to perform the resonance heating simultaneously.

(4) Working Process of a Heating Mode where the Inner and Outer Ring Coil Disks Work Simultaneously (the Controller Controls the First Resonance Device and the Second Resonance Device to Work Simultaneously According to the Second Synchronization Signal)

The second end ② and the third end ③ of the third selection switch 735 are connected, the second end ② and the third end ③ of the first selection switch 733 are connected, and the second end ② and the third end ③ of the second selection switch 734 are connected. The second synchronization signal is passed through the first selection switch 733, the second selection switch 734 and the third selection switch 735, and sent to the input terminal Trg1 of the first pulse generator 731 and the input terminal Trg2 of the second pulse generator 732, respectively. The controller 73 sets the flags START1 and START2, inputs a trigger signal (the second synchronization signal) to the input terminal Trg1 of the first pulse generator 731 and to the input terminal Trg2 of the second pulse generator 732, and starts a first pulse output.

In stage 1, the controller 73 controls, according to the second synchronization signal, the first pulse generator 731 and the second pulse generator 732 to output the valid signals simultaneously. The first driving circuit 71 and the second driving circuit 72 output a high level signal (such as 18V), respectively. The first power switch 30 and the second power switch 40 are turned on at the same time, and the subsequent working process is similar to that of the inner ring and the outer ring described above, except that the second synchronization signal is passed through the internal selection switches and sent to the input terminal Trg1 of the first pulse generator 731 and the input terminal Trg2 of the second pulse generator 732, respectively. The second synchronization signal is used to trigger the first pulse generator 731 and the second pulse generator 732 to output a valid signal for a next cycle, and then the process of the stage 1 is performed again. In this way, the inner and outer ring coil disks are controlled by the second synchronization signal to perform the resonance heating simultaneously.

From the above processes (1) to (4), it can be known that when a single coil disk of the inner and outer rings works, it is similar to an utensil which is heated by a single coil disk, the controller 73 selects and controls a synchronization triggering signal corresponding to its own resonance device. By controlling the two resonance devices to work alternately, the utensil may be heated more uniformity. When the inner and outer ring coil disks are used for heating simultaneously, the controller 73 is set according to the system configuration, the two pulse generators may use the same synchronization trigger source. The trigger source may select the first synchronization signal input by the first synchronization signal detecting terminal SYNC1 or the second synchronization signal input by the second synchronization signal detecting terminal SYNC2, and use the same synchronization signal to trigger the first pulse generator and the second pulse generator, and the first power switch 30 and the second power switch 40 are turned on simultaneously, turned off simultaneously and perform resonance operation simultaneously after being turned off. Moreover, the first coil disk COL1 and the second coil disk COL2 have the same inductance and the same winding direction, and the first resonance capacitor C1 and the second resonance capacitor C2 have the same capacitance. The resonance frequencies of the two resonance devices are the same. A phase difference between the magnetic field phases generated by the two coil disks maintains at zero at any time, and the resultant magnetic field is maximum, the heating efficiency is maximum, and, at the same time, the synchronization circuit is stable, the power switch works more safely, thus increasing the service life of the power switch.

In conclusion, with such a heating control circuit for an electromagnetically-heating cooking utensil of the present disclosure, the control device selects the first synchronization signal to generate the driving signal for driving the first power switch, selects the second synchronization signal to generate the driving signal for driving the second power switch, and selects one of the first synchronization signal and the second synchronization signal to generate the driving signal for driving the first power switch and the second power switch, according to the heating mode of the electromagnetically-heating cooking utensil. Therefore, by adding the dual-channel resonance heating system which may select the synchronizing signal trigger source, the heating efficiency of the cooking system is improved and the service life of the switch is increased.

Figure 3:
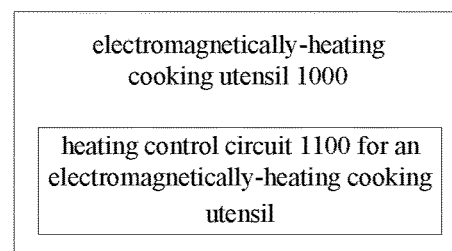
FIG. 3 is a block diagram of an electromagnetically-heating cooking utensil according to an embodiment of the present disclosure.

FIG. 3 is a block diagram of an electromagnetically-heating cooking utensil according to an embodiment of the present disclosure. As shown in FIG. 3, the electromagnetically-heating cooking utensil 1000 may include the heating control circuit 1100 for an electromagnetically-heating cooking utensil as described above.

With such an electromagnetically-heating cooking utensil according to the embodiments of the present disclosure, by applying the heating control circuit for the electromagnetically-heating cooking utensil as described above, the heating efficiency of the cooking system is improved and the service life of the switch is increased.

Figure 4:
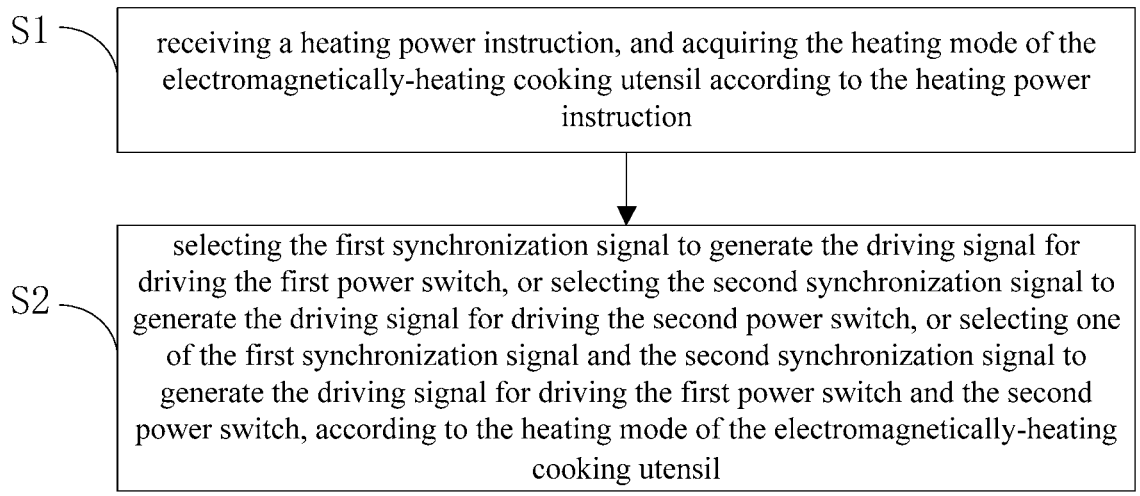
FIG. 4 is a flow chart of a heating control method for an electromagnetically-heating cooking utensil according to an embodiment of the present disclosure.

FIG. 4 is a flow chart of a heating control method for an electromagnetically-heating cooking utensil according to an embodiment of the present disclosure. As shown in FIG. 4, the heating control method for an electromagnetically-heating cooking utensil may include following steps.

In S1, receiving a heating power instruction, and acquiring the heating mode of the electromagnetically-heating cooking utensil according to the heating power instruction.

In S2, selecting the first synchronization signal to generate the driving signal for driving the first power switch, or selecting the second synchronization signal to generate the driving signal for driving the second power switch, or selecting one of the first synchronization signal and the second synchronization signal to generate the driving signal for driving the first power switch and the second power switch, according to the heating mode of the electromagnetically-heating cooking utensil.

In an embodiment of the present disclosure, the electromagnetically-heating cooking utensil may include: a first driving circuit, an output terminal of the first driving circuit being connected to the control terminal of the first power switch, and the first driving circuit being configured to drive the first power switch to be on or off; a second driving circuit, an output terminal of the second driving circuit being connected to the control terminal of the second power switch, and the second driving circuit being configured to drive the second power switch to be on or off; a controller configured to generate a first control signal according to the first synchronization signal to output a driving signal through the first driving circuit, generate a second control signal according to the second synchronization signal to output a driving signal through the second driving circuit, and generate a third control signal according to one of the first synchronization signal and the second synchronization signal to output a driving signal through the first driving circuit and the second driving circuit, respectively. The controller includes: a first pulse generator and a second pulse generator; a first selection switch, a first end of the first selection switch being connected to the output terminal of the first synchronization device and a second end of the first selection switch being connected to the first pulse generator; a second selection switch, a first end of the second selection switch being connected to the output terminal of the second synchronization device, a second end of the second selection switch being connected to the second pulse generator, and a third end of the second selection switch being connected to a third end of the first selection switch; a third selection switch, a first end of the third selection switch being connected to the output terminal of the first synchronization device, a second end of the third selection switch being connected to the third end of the first selection switch and the third end of the second selection switch, respectively, and a third end of the third selection switch being connected to the first end of the second selection switch. The controller is configured to control the first selection switch, the second selection switch and the third selection switch to select the first synchronization signal, the second synchronization signal, or one of the first synchronization signal and the second synchronization signal.

In an embodiment of the present disclosure, when the first end of the first selection switch is connected to the second end of the first selection switch, the controller outputs the first control signal through the first pulse generator according to the first synchronization signal, and the first resonance device performs the resonance operation. When the first end of the second selection switch is connected to the second end of the second selection switch, the controller outputs the second control signal through the second pulse generator according to the second synchronization signal, and the second resonance device performs the resonance operation. When the second end of the first selection switch is connected to the third end of the first selection switch, the second end of the second selection switch is connected to the third end of the second selection switch and the first end of the third selection switch is connected to the second end of the third selection switch, the controller outputs a control signal through the first pulse generator and the second pulse generator, respectively, according to the first synchronization signal, and the first resonance device and the second resonance device perform the resonance operations simultaneously. When the second end of the first selection switch is connected to the third end of the first selection switch, the second end of the second selection switch is connected to the third end of the second selection switch and the second end of the third selection switch is connected to the third end of the third selection switch, the controller outputs a control signal through the first pulse generator and the second pulse generator, respectively, according to the second synchronization signal, and the first resonance device and the second resonance device perform the resonance operations simultaneously.

It should be noted that details not disclosed in the embodiments of the heating control method for an electromagnetically-heating cooking utensil of the present disclosure may refer to the details disclosed in the embodiments of the heating control circuit for an electromagnetically-heating cooking utensil of the present disclosure, which will not be elaborated in detail herein.

With such a heating control method for an electromagnetically-heating cooking utensil of the present disclosure, by receiving the heating power instruction, acquiring the heating mode of the electromagnetically-heating cooking utensil according to the heating power instruction, and selecting the first synchronization signal to generate the driving signal for driving the first power switch, or selecting the second synchronization signal to generate the driving signal for driving the second power switch, or selecting one of the first synchronization signal and the second synchronization signal to generate the driving signal for driving the first power switch and the second power switch, according to the heating mode of the electromagnetically-heating cooking utensil, the method may improve the heating efficiency of the cooking system and increase the service life of the switch.

It should be understood that each part of the present disclosure may be realized by the hardware, software, firmware or their combination. In the above embodiments, a plurality of steps or methods may be realized by the software or firmware stored in the memory and executed by the appropriate instruction execution system. In one embodiment, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

In addition, in the specification, it is to be understood that terms such as "central", "longitudinal", "lateral", "length", "width", "thickness", "upper", "lower", "front", "rear", "left", "right", "vertical", "horizontal", "top", "bottom", "inner", "outer", "clockwise", "counterclockwise", "axial", "radial" and "circumferential" should be construed to refer to the orientation as then described or as shown in the drawings under discussion. These relative terms are for convenience of description and do not require that the present disclosure be constructed or operated in a particular orientation, and thus shall not be construed to limit the present disclosure.

In addition, terms such as "first" and "second" are used herein for purposes of description and are not intended to indicate or imply relative importance or significance or to imply the number of indicated embodiments. Thus, the feature defined with "first" and "second" may include one or more of this feature. In the description of the present disclosure, unless specified otherwise, "a plurality of" means at least two, for example two or three.

In the present disclosure, unless specified or limited otherwise, the terms "mounted", "connected", "coupled", "fixed" and the like are used broadly, and may be, for example, fixed connections, detachable connections, or integral connections; may also be mechanical or electrical connections; may also be direct connections or indirect connections via intervening structures; may also be inner communications of two elements.

In the description, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on", "above" or "on top of" a second feature may include an embodiment in which the first feature is right or obliquely "on", "above" or "on top of" the second feature, or just means that the first feature is at a height higher than that of the second feature; while a first feature "below", "under" or "on bottom of" a second feature may include an embodiment in which the first feature is right or obliquely "below", "under" or "on bottom of" the second feature, or just means that the first feature is at a height lower than that of the second feature.

Reference throughout this specification to "an embodiment", "some embodiments", "an example", "a specific example", or "some examples" means that a particular feature, structure, material, or characteristic described in connection with the embodiment or example is included in at least one embodiment or example of the present disclosure. Thus, the appearances of above phrases in various places throughout this specification are not necessarily referring to the same embodiment or example of the present disclosure. Furthermore, the particular features, structures, materials, or characteristics may be combined in any suitable manner in one or more embodiments or examples.

What is claimed is:

1. A heating control circuit for an electromagnetically-heating cooking utensil, comprising:
    a first resonance circuit;
    a second resonance circuit, one end of the second resonance circuit being connected to one end of the first resonance circuit and further connected to a power supply device of the electromagnetically-heating cooking utensil, wherein the first resonance circuit comprises a first resonance capacitor and a first coil disk connected in parallel, the second resonance circuit comprises a second resonance capacitor and a second coil disk connected in parallel, and the first coil disk and the second coil disk are arranged in a form of an inner ring and an outer ring;
    a first power switch configured to control whether the first resonance circuit performs a resonance operation, a first end of the first power switch being connected to another end of the first resonance circuit;
    a second power switch configured to control whether the second resonance circuit performs a resonance operation, a first end of the second power switch being connected to another of the second resonance circuit, and a second end of the second power switch being connected to a second end of the first power switch and further grounded;
    a first synchronization circuit connected to two ends of the first resonance circuit and configured to detect a voltage of the two ends of the first resonance circuit to output a first synchronization signal;

a second synchronization circuit connected to two ends of the second resonance circuit and configured to detect a voltage of the two ends of the second resonance circuit to output a second synchronization signal; and a control circuit comprising a first synchronization signal detecting terminal, a second synchronization signal detecting terminal, a first driving output terminal and a second driving output terminal, wherein the first synchronization signal detecting terminal is connected to an output terminal of the first synchronization circuit, the second synchronization signal detecting terminal is connected to an output terminal of the second synchronization circuit, the first driving output terminal is connected to a control terminal of the first power switch and the second driving output terminal is connected to a control terminal of the second power switch, and wherein the control circuit is configured to select the first synchronization signal to generate a driving signal for driving the first power switch, select the second synchronization signal to generate a driving signal for driving the second power switch, and select one of the first synchronization signal and the second synchronization signal to generate a driving signal for driving the first power switch and the second power switch, according to a heating mode of the electromagnetically-heating cooking utensil;

wherein the first coil disk and the second coil disk have a same inductance and a same winding direction, and the first resonance capacitor and the second resonance capacitor have a same capacitance.

2. The heating control circuit for an electromagnetically-heating cooking utensil according to claim 1, wherein the control circuit comprises:

a first driving circuit, an output terminal of the first driving circuit being connected to the control terminal of the first power switch, and the first driving circuit being configured to drive the first power switch to be on or off;

a second driving circuit, an output terminal of the second driving circuit being connected to the control terminal of the second power switch, and the second driving circuit being configured to drive the second power switch to be on or off; and a controller configured to generate a first control signal according to the first synchronization signal to output a driving signal through the first driving circuit, generate a second control signal according to the second synchronization signal to output a driving signal through the second driving circuit, and generate a third control signal according to one of the first synchronization signal and the second synchronization signal to output a driving signal through the first driving circuit and the second driving circuit, respectively.

3. The heating control circuit for an electromagnetically-heating cooking utensil according to claim 2, wherein the controller comprises:

a first pulse generator and a second pulse generator;

a first selection switch, a first end of the first selection switch being connected to the output terminal of the first synchronization circuit and a second end of the first selection switch being connected to the first pulse generator;

a second selection switch, a first end of the second selection switch being connected to the output terminal of the second synchronization circuit, a second end of the second selection switch being connected to the second pulse generator, and a third end of the second selection switch being connected to a third end of the first selection switch;

a third selection switch, a first end of the third selection switch being connected to the output terminal of the first synchronization circuit, a second end of the third selection switch being connected to the third end of the first selection switch and the third end of the second selection switch, respectively, and a third end of the third selection switch being connected to the first end of the second selection switch;

wherein the controller is configured to control the first selection switch, the second selection switch and the third selection switch to select the first synchronization signal, the second synchronization signal, or one of the first synchronization signal and the second synchronization signal.

4. The heating control circuit for an electromagnetically-heating cooking utensil according to claim 3, wherein when the first end of the first selection switch is connected to the second end of the first selection switch, the controller outputs the first control signal through the first pulse generator according to the first synchronization signal, and the first resonance circuit performs the resonance operation;

when the first end of the second selection switch is connected to the second end of the second selection switch, the controller outputs the second control signal through the second pulse generator according to the second synchronization signal, and the second resonance circuit performs the resonance operation;

when the second end of the first selection switch is connected to the third end of the first selection switch, the second end of the second selection switch is connected to the third end of the second selection switch and the first end of the third selection switch is connected to the second end of the third selection switch, the controller outputs a control signal through the first pulse generator and the second pulse generator, respectively, according to the first synchronization signal, and the first resonance circuit and the second resonance circuit perform resonance operations simultaneously;

when the second end of the first selection switch is connected to the third end of the first selection switch, the second end of the second selection switch is connected to the third end of when the second end of the first selection switch is connected to the third end of the first selection switch, the second end of the second selection switch is connected to the third end of the second selection switch and the second end of the third selection switch is connected to the third end of the third selection switch, the controller outputs a control signal through the first pulse generator and the second pulse generator, respectively, according to the second synchronization signal, and the first resonance circuit and the second resonance circuit perform resonance operations simultaneously.

5. The heating control circuit for an electromagnetically-heating cooking utensil according to claim 1, wherein the first synchronization circuit and the second synchronization circuit both comprise a comparator and share a detection branch.

6. An electromagnetically-heating cooking utensil, comprising:

a heating control circuit for an electromagnetically-heating cooking utensil, comprising:

a first resonance circuit;

a second resonance circuit, one end of the second resonance circuit being connected to one end of the first resonance circuit and further connected to a power supply device of the electromagnetically-heating cooking utensil, wherein the first resonance circuit comprises a first resonance capacitor and a first coil disk connected in parallel, the second resonance circuit comprises a second resonance capacitor and a second coil disk connected in parallel, and the first coil disk and the second coil disk are arranged in a form of an inner ring and an outer ring;

a first power switch configured to control whether the first resonance circuit performs a resonance operation, a first end of the first power switch being connected to another end of the first resonance circuit;

a second power switch configured to control whether the second resonance circuit performs a resonance operation, a first end of the second power switch being connected to another of the second resonance circuit, and a second end of the second power switch being connected to a second end of the first power switch and further grounded;

a first synchronization circuit connected to two ends of the first resonance circuit and configured to detect a voltage of the two ends of the first resonance circuit to output a first synchronization signal;

a second synchronization circuit connected to two ends of the second resonance circuit and configured to detect a voltage of the two ends of the second resonance circuit to output a second synchronization signal; and a control circuit comprising a first synchronization signal detecting terminal, a second synchronization signal detecting terminal, a first driving output terminal and a second driving output terminal, wherein the first synchronization signal detecting terminal is connected to an output terminal of the first synchronization circuit, the second synchronization signal detecting terminal is connected to an output terminal of the second synchronization circuit, the first driving output terminal is connected to a control terminal of the first power switch and the second driving output terminal is connected to a control terminal of the second power switch, and wherein the control circuit is configured to select the first synchronization signal to generate a driving signal for driving the first power switch, select the second synchronization signal to generate a driving signal for driving the second power switch, and select one of the first synchronization signal and the second synchronization signal to generate a driving signal for driving the first power switch and the second power switch, according to a heating mode of the electromagnetically-heating cooking utensil;

wherein the first coil disk and the second coil disk have a same inductance and a same winding direction, and the first resonance capacitor and the second resonance capacitor have a same capacitance.

7. A heating control method for an electromagnetically-heating cooking utensil according to claim 6, comprising:
receiving a heating power instruction, and acquiring the heating mode of the electromagnetically-heating cooking utensil according to the heating power instruction;
selecting the first synchronization signal to generate the driving signal for driving the first power switch, or selecting the second synchronization signal to generate the driving signal for driving the second power switch, or selecting one of the first synchronization signal and the second synchronization signal to generate the driving signal for driving the first power switch and the second power switch, according to the heating mode of the electromagnetically-heating cooking utensil.

8. The heating control method for an electromagnetically-heating cooking utensil according to claim 7, wherein the electromagnetically-heating cooking utensil comprises:
a first driving circuit, an output terminal of the first driving circuit being connected to the control terminal of the first power switch, and the first driving circuit being configured to drive the first power switch to be on or off;
a second driving circuit, an output terminal of the second driving circuit being connected to the control terminal of the second power switch, and the second driving circuit being configured to drive the second power switch to be on or off;
a controller configured to generate a first control signal according to the first synchronization signal to output a driving signal through the first driving circuit, generate a second control signal according to the second synchronization signal to output a driving signal through the second driving circuit, and generate a third control signal according to one of the first synchronization signal and the second synchronization signal to output a driving signal through the first driving circuit and the second driving circuit, respectively, wherein the controller comprises:
a first pulse generator and a second pulse generator;
a first selection switch, a first end of the first selection switch being connected to the output terminal of the first synchronization circuit and a second end of the first selection switch being connected to the first pulse generator;
a second selection switch, a first end of the second selection switch being connected to the output terminal of the second synchronization circuit, a second end of the second selection switch being connected to the second pulse generator, and a third end of the second selection switch being connected to a third end of the first selection switch;
a third selection switch, a first end of the third selection switch being connected to the output terminal of the first synchronization circuit, a second end of the third selection switch being connected to the third end of the first selection switch and the third end of the second selection switch, respectively, and a third end of the third selection switch being connected to the first end of the second selection switch;
wherein the controller is configured to control the first selection switch, the second selection switch and the third selection switch to select the first synchronization signal, the second synchronization signal, or one of the first synchronization signal and the second synchronization signal.

9. The heating control method for an electromagnetically-heating cooking utensil according to claim 8, wherein
when the first end of the first selection switch is connected to the second end of the first selection switch, the controller outputs the first control signal through the first pulse generator according to the first synchronization signal, and the first resonance circuit performs the resonance operation;
when the first end of the second selection switch is connected to the second end of the second selection switch, the controller outputs the second control signal through the second pulse generator according to the second synchronization signal, and the second resonance circuit performs the resonance operation;

when the second end of the first selection switch is connected to the third end of the first selection switch, the second end of the second selection switch is connected to the third end of the second selection switch and the first end of the third selection switch is connected to the second end of the third selection switch, the controller outputs a control signal through the first pulse generator and the second pulse generator, respectively, according to the first synchronization signal, and the first resonance circuit and the second resonance circuit perform resonance operations simultaneously;

when the second end of the first selection switch is connected to the third end of the first selection switch, the second end of the second selection switch is connected to the third end of when the second end of the first selection switch is connected to the third end of the first selection switch, the second end of the second selection switch is connected to the third end of the second selection switch and the second end of the third selection switch is connected to the third end of the third selection switch, the controller outputs a control signal through the first pulse generator and the second pulse generator, respectively, according to the second synchronization signal, and the first resonance circuit and the second resonance circuit perform resonance operations simultaneously.

\* \* \* \* \*